March 23, 1965     T. J. GRAY     3,174,855
METHOD FOR A PRODUCTION OF A XEROGRAPHIC PLATE
Filed Feb. 23, 1961
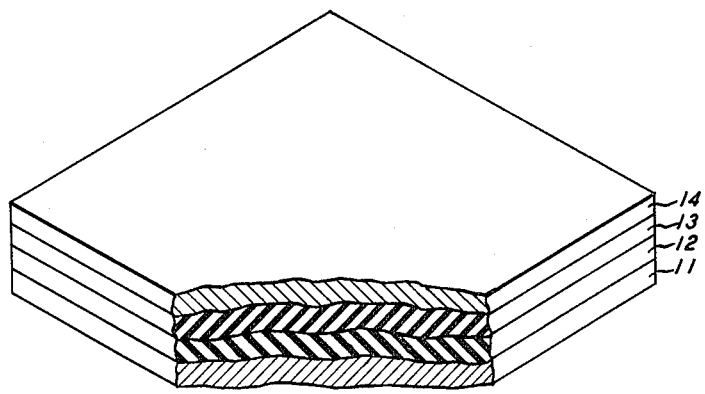
INVENTOR.
THOMAS J. GRAY
BY
ATTORNEY 3,174,855
METHOD FOR A PRODUCTION OF A XEROGRAPHIC PLATE
Thomas J. Gray, Alfred, N.Y., assignor to Xerox Corporation, Rochester, N.Y., a corporation of New York
Filed Feb. 23, 1961, Ser. No. 91,095
5 Claims. (Cl. 96—1)

This invention relates to xerography and in particular to improved xerographic plate construction and the process for producing same.

In xerography as originally disclosed in Carlson Patent 2,297,691, there is employed a member sensitive to activating radiation, such as visible light, and generally comprising a photoconductive insulating layer disposed on a conductive backing member, the combination of which is referred to in the art as "a xerographic plate." In accordance with the Carlson invention, an electrostatic latent image is formed on the plate by the selective conduction or dissipation of an electrostatic charge caused by an optical image either of the visible or invisible spectra on the photoconductive layer. Usually this is accomplished by placing a uniform electrostatic charge on the layer and exposing the charged layer through optics to an image of activating radiation, whereby the layer becomes selectively conductive in the activated areas.

Of the photoconductive insulating materials known, some have been exploited to larger or lesser extents and the most commercially successful of which has been amorphous selenium as first disclosed in copending Bixby application Ser. No. 526,781, filed August 5, 1955. As the art of xerography progressed advancements in the art produced selenium alloys of improved properties and provided improved construction and construction processes for producing xerographic plates. Each of the advancements contributed to extend and enhance xerographic plates through increased ranges of responsiveness and operability. Typical of these improvements are those disclosed in Dessauer et al. patent U.S. 2,901,348; Schaffert et al. patent U.S. 2,901,349; Paris patent U.S. 2,803,541; Mengali patent U.S. 2,745,327 and Ullrich patent U.S. 2,803,542. Disclosures in the patents and application above-cited include selenium alloys for forming varied compositions of photoconductive selenium layers each having a predominance of vitreous selenium. In addition there is disclosed various arrangements of superposed layer construction including the use of an interfacial barrier layer between the backing member and the photoconductive insulating layer.

Xerographic plates employing selenium and its alloys as a photoconductive insulator have progressed in the art to a proficient level of utilization and enjoy a high degree of commercial success. However, preparation of such commercial plates with a barrier layer requires extensive and expensive processing of the backing member to form the proper barrier layer essential for a high quality xerographic plate. Moreover, even when such care and expense is observed, adhesion to the backing is often poor unless a premium backing material, such as brass, is used. The development of flexible xerographic plates makes mandatory a high degree of adhesion between the selenium photoconductor and the backing member to enable the plate to withstand repeated flexing without flaking of the selenium.

Now in accordance with the present invention there is provided a novel process for producing a xerographic plate in which the photoconductive selenium layer is bondable to various backing members with an adhesive force at least comparable to that previously attainable only with brass and substantially greater than was capable of being effected by processes of the prior art. It has been further found that a xerographic plate constructed in accordance with the process of the invention, in addition to having enhanced bonding properties, also has increased red spectral sensitivity over plates constructed in accordance with processes of the prior art.

It is therefore the principal object of the invention to provide improved process for producing a xerographic plate with increased adhesive bond between a photoconductive insulating layer comprising predominantly selenium and a backing member.

It is a further object of the invention to provide a xerographic plate having increased red spectral sensitivity over plates constructed in accordance with processes of the known art.

It is also an object of the invention to provide a method of processing a backing material to provide a barrier layer having the requisite electrical properties desirable in a high quality xerographic plate which is inexpensive, efficient, easily adaptable to high speed processing and largely independent of the nature of the backing material.

Additional objects of the invention and means by which these objects are achieved will in part be obvious and in part become apparent from the following specification and from the drawing which isometrically illustrates, partly in section, a xerographic plate constructed in accordance with the invention.

Referring to the drawing, the xerographic plate, in general, comprises a conductive backing member 11, supporting on one surface thereof a barrier or junction layer 12 and, thereover a photoconductive insulating layer 13. Optionally, on the upper or outer surface of the photoconductive layer there may be included an insulating layer 14 such as disclosed in the Ullrich patent cited above, or the photoconductive layer 13 of vitreous selenium may be coated with a photoconductive alloy of selenium as disclosed in the patent of Paris also cited above.

The conductive base member 11 generally comprises a conductive layer characterized by the ability to conduct electricity for the charging or sensitization of the composite member and to accommodate the release of electrical charge upon exposure of the member to a source of activating radiation. Desirably, this base member 11 is also of sufficient structural strength to provide mechanical support or strength to the photosensitive member, thus making it mechanically suited to operation in conjunction with xerographic machines and apparatus. Thus, for example, this base member 11 may comprise a metallic plate, web, foil or the like, or, if desired, such suitable member as a conductive plastic, conductive glass, conductive paper, an insulating material coated with a conductive material, or similar member all of which, desirably may be in the form of a plane, cylindrical surface, or other shape. The backing member, as desired, may be relatively rigid as in the case of a metallic plate, cylinder, or the like or may be relatively flexible as with a metallic foil, a plastic web, or similar member. In general, the electrical conductivity of this support member must be relatively high as compared with the electrical conductivity of the layers coated thereon.

The barrier or junction layer 12 consists of selenium which, in accordance with the invention, is electrically deposited onto the conductive member and which has been found to be an unsuitable photoconductor for xerographic plates. Thereafter a photoconductive layer 13 of amorphous selenium is deposited thereon as by vacuum evaporation or other means known in the art, as for example, disclosed in the Ullrich patent above-cited.

The following examples illustrate the invention:

*Example 1*

Virgin aluminum plates of .050 inch thickness were first cleaned for 5 minutes in a solution comprised of a saturated solution of potassium dichromate in a commercial concentration of sulphuric acid after which the plates were rinsed sequentially in cold water, hot tap water and cold deionized water. Immediately after rinsing each plate were immersed in an electrolytic bath consisting of 4.36 N selenious acid prepared from selenium dioxide and water at room temperature, the plate being utilized as the cathode while a stainless steel anode was used. Heaters were utilized to maintain desirable bath temperature and a 12 volt battery was utilized to provide the necessary electric current. The baths were operated under controlled conditions in which immersion time differed from 1 to 5 minutes, current varied from .034 amp to 7 amps corresponding to current densities respectively of .001 and .2 amp/inch$^2$, voltage differed from 2.8 to 10.5 volts and bath temperature differed from 30° to 53° C. On removal from the bath, each plate was rinsed in warm water of about 52° C. and then each was rinsed in cold deionized water before being dried at approximately 60° C. After drying, an 80 micron photoconductive layer of amorphous selenium was evaporated onto the plates by vacuum evaporation methods known in the art.

Each plate so prepared was then tested for adhesive bond by applying to the photoconductive selenium layer a strip of "Scotch" brand tape marketed by the Minnesota Mining & Manufacturing Company and which was rapidly pulled off. Whereas this same adhesive test when applied to existing plates other than those with a brass substrate consistently removes the photoconductive selenium layer, in each instance with the prepared plates no removal of selenium occurred thereby displaying superior adhesive bonding properties.

The plates were then subjected to light sensitivity tests with light of different wave lengths. A plate was first charged to a given voltage and the loss of charge after exposure for a given time period was compared to the initial charge and expressed as a percentage. The plates were found to have normal white light sensitivity and when exposing the plates to a 40 watt rubby light for 15 seconds and spaced at 1 meter, the plates showed 70 to 90 percent red sensitivity, as contrast a control plate prepared without the interlayer and corresponding to a standard commercial xerographic plate which had less than 10 percent red sensitivity.

*Example 2*

Xerographic plates using virgin aluminum not cleaned prior to electrolytic treatment, were constructed and tested in a similar manner as described in Example 1. The electrolytic baths were operated under controlled conditions in which immersion time differed from 15 to 30 seconds, current varied from 3 to 6 amps, corresponding to current densities respectively of .088 and .177 amp/inch$^2$, voltage differed from about 5 to 10.2 volts, and bath temperature differed from 48° to 50° C. On removal from the bath, each plate was rinsed in water of about 40° C. and then each was rinsed in cold deionized water before being dried at approximately 60° C. After drying, an 80 micron photoconductive layer of amorphous selenium was evaporated onto the plates. The plates were subjected to adhesive and light sensitivity tests similarly as in Example 1. The tests indicated similar adhesive properties as the prepared samples of Example 1 and a red light sensitivity in the range of approximately 60 to 81 percent, as contrast a control plate mentioned in Example 1 having less than 10 percent red sensitivity.

Plates prepared by the process of the invention require no complicated processing other than simple electrolysis in selenious acid. Electrolytic plates so prepared had moderately high dark discharge although well within the range of use in automatic machines with the advantage of exceptionally high red sensitivity and outstanding adhesion between the layers giving particularly long plate life under commercial process conditions for rigid plates and making possible development of new xerographic machines utilizing flexible plates.

Whereas each of the above examples illustrate the process of the invention using an aluminum substrate and vitreous selenium as the photoconductor it is to be understood that analogous results have been attained with other substrate materials and other photoconductors. Suitable substrates include copper, nickel, tin, iron, steel, zinc, conductive oxides, etc. whereas photoconductors other than vitreous selenium include photoconductive selenium alloys of arsensic and tellurium as well as dual photoconductive layers as disclosed in the Paris patent cited in which the topmost photoconductive layer is comprised of a selenium alloy of arsenic or tellurium.

The nature of the electrodeposited interlayers of selenium is not understood. The layer produces no rise in gross plate potential as determined by measurements currently used in the xerographic art. This would indicate that the electrolytic selenium has a markedly lower resistivity than the vacuum deposited selenium. However, the fact that the dark current discharge is low, i.e., in the absence of activating radiation, indicates that the electrolytic selenium layer has sufficient resistivity, or limited carrier mobility, to produce a barrier against carrier injection from the base conductor to the vacuum deposited selenium. The electrolytic selenium layer has a red color and appears non-crystalline. Direct measurements of its photonconductive properties by methods commonly used in xerography was precluded because of its low resistivity.

The thickness of the deposited layer was found to require a minimum dimension sufficient to ensure continuous contact, being on the order of 0.1 micron. No critical upper limit was determined although an upper limit of 10 microns is regarded as somewhat of an economic limitation. The preferred thickness range was found to be between about 1 and 8 microns.

For electrolytic reduction of selenious acid to take place at the cathode the electrolysis should be conducted in an acidic solution. Generally, the pH should be in the range of from about 3 to about 6. Selenic acid may be used in place of selenious acid, if desired.

It has also been found in accordance with the invention that a mixed film containing selenium and tellurium can be deposited by the electrolysis of selenic and telluric acids in aqueous solution pH 3–6 with an applied potential 2–10 v. at a temperature 30–40° C. using high purity aluminum plates as the cathode and a graphite plate as the anode. The mechanism involved in this process is believed to be the reduction of the selenic and telluric acids by the nascent hydrogen developed at the cathode.

What is claimed is:

1. A process for recording a pattern of light and shadow comprising, in sequence, depositing a selenium layer by electrolysis from selenious acid onto a conductive backing member, vapor depositing a layer comprised predominantly of vitreous selenium onto said selenium layer first deposited, in the absence of activating radiation placing sensitizing electrostatic charges of one polarity on the surface of said layer comprised predominantly of vitreous selenium, exposing the thus charged surface to a pattern of light and shadow to be recorded whereby an electrostatic latent image is formed corresponding to said pattern and depositing electrically attractable finely divided marking material selectively in conformity with the electrostatic image thus produced.

2. The process of forming a xerographic plate comprising the steps of depositing a selenium layer by electrolysis from an aqueous acidic solution containing a dissolved selenium compound onto a conductive backing member, and vapor depositing a layer comprised predominantly of vitreous selenium onto said selenium layer first deposited.

3. The process of forming a xerographic plate comprising the steps of depositing a selenium layer by electrolysis from selenious acid onto a conductive backing member, and vapor depositing a layer comprised predominantly of vitreous selenium onto said selenium layer first deposited.

4. The process of forming a xerographic plate comprising the steps of depositing a selenium layer by electrolysis from selenious acid onto a conductive backing member supported at the cathode, and vapor depositing a layer comprised predominantly of vitreous selenium onto said selenium layer first deposited.

5. The process of forming a xerographic plate comprising the steps of depositing a selenium layer by electrolysis from an acidic solution containing a dissolved selenium compound onto a conductive backing member, and vapor depositing a photoconductive layer comprised of a photoconductive alloy of selenium onto said selenium layer first deposited.

References Cited in the file of this patent

UNITED STATES PATENTS

| 2,803,541 | Paris | Aug. 20, 1957 |
| 3,041,166 | Bardeen | June 26, 1962 |

FOREIGN PATENTS

| 930,185 | France | Jan. 19, 1948 |

OTHER REFERENCES

Jilek et al.: Chemical Abstracts, vol. 22, page 1734 (1928).

Fink et al.: Trans. Electrochem. Society, vol. 62, pages 369–381.

Wilcke: Photo. Korresp., vol. 57, pages 173–175 (1920).